US008793367B2

(12) United States Patent
Hara

(10) Patent No.: US 8,793,367 B2
(45) Date of Patent: Jul. 29, 2014

(54) COMMUNICATION UNIT, METHOD OF CONTROLLING COMMUNICATION UNIT AND COMPUTER PROGRAM

(75) Inventor: Kazutoshi Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 12/606,133

(22) Filed: Oct. 26, 2009

(65) Prior Publication Data
US 2010/0121952 A1    May 13, 2010

(30) Foreign Application Priority Data
Nov. 12, 2008 (JP) ................................. 2008-290330

(51) Int. Cl.
*G06F 15/173* (2006.01)
(52) U.S. Cl.
USPC .......................................... 709/224; 709/223
(58) Field of Classification Search
CPC ................. H04L 63/0428; H04L 2012/2841; H04L 63/08; H04W 12/06; H04W 84/18; G06F 3/1292
USPC ................. 709/223, 224, 226, 228, 238, 241; 455/41.2, 421, 445
See application file for complete search history.

(56) References Cited

U.S. PATENT DOCUMENTS

| | | | |
|---|---|---|---|
| 6,397,061 B1 * | 5/2002 | Jordan et al. | ................... 455/421 |
| 6,813,272 B1 * | 11/2004 | An et al. | ................... 370/395.21 |
| 7,555,056 B2 | 6/2009 | Hara et al. | |
| 7,711,388 B2 | 5/2010 | Noda et al. | |
| 8,150,449 B2 | 4/2012 | Onozawa | |
| 2001/0003191 A1 * | 6/2001 | Kovacs et al. | ................... 709/226 |
| 2003/0036350 A1 * | 2/2003 | Jonsson et al. | ................... 455/41 |
| 2004/0057409 A1 * | 3/2004 | Kennedy | ........................ 370/338 |
| 2004/0203359 A1 * | 10/2004 | Sasai et al. | .................... 455/41.1 |
| 2005/0021725 A1 * | 1/2005 | Lobbert | ........................ 709/223 |
| 2006/0212732 A1 | 9/2006 | Mashimo et al. | |
| 2007/0207765 A1 | 9/2007 | Nakahara et al. | |
| 2008/0045159 A1 * | 2/2008 | Mashimo et al. | ............... 455/68 |

FOREIGN PATENT DOCUMENTS

| | | |
|---|---|---|
| JP | 2004-15654 A | 1/2004 |
| JP | 2004-235963 A | 8/2004 |
| JP | 2007-158447 A | 6/2007 |

OTHER PUBLICATIONS

Hunt, P., Certified Wireless USB Security and Association Models, Developers Conference 2007, Amsterdam, The Netherlands, USB Implementers Forum, Inc., pp. 1-27, Oct. 31, 2007.
Vertenten, B., Wireless USB Usage Models, Philips Semiconductors, USB Implementers Forum, Inc., pp. 1-15, May 31, 2005.
Japanese Office Action dated Nov. 12, 2012 issued in corresponding Japanese Patent Application No. 2008-290330.

* cited by examiner

*Primary Examiner* — Peling Shaw
(74) *Attorney, Agent, or Firm* — Fitzpatrick, Cella, Harper & Scinto

(57) ABSTRACT

Conventionally, when a communication unit needed to apply an authentication process to other communication units, a problem arose in that the communication unit could not be quickly connected to a communication unit near a user and to which the user wishes the communication unit to connect. In this invention, a station measures a range to other communication units in the surrounding area and possesses a trigger, which is initiated by a user, for beginning an authentication process; when initiated, the station selects the nearest communication unit based on the result of the measurement and applies the authentication process to it.

9 Claims, 12 Drawing Sheets

FIG. 6

| No. | HOST ID | Connection Availability | T3 |
|---|---|---|---|
| 1 | 012345AB | ALL | |
| 2 | 234567CD | ALL | |
| 3 | 456789EF | LIMITED | |

FIG. 7

| No. | HOST ID | Connection Availability | T3 |
|---|---|---|---|
| 1 | 012345AB | ALL | 3ns |
| 2 | 234567CD | ALL | 1ns |
| 3 | 456789EF | LIMITED | |

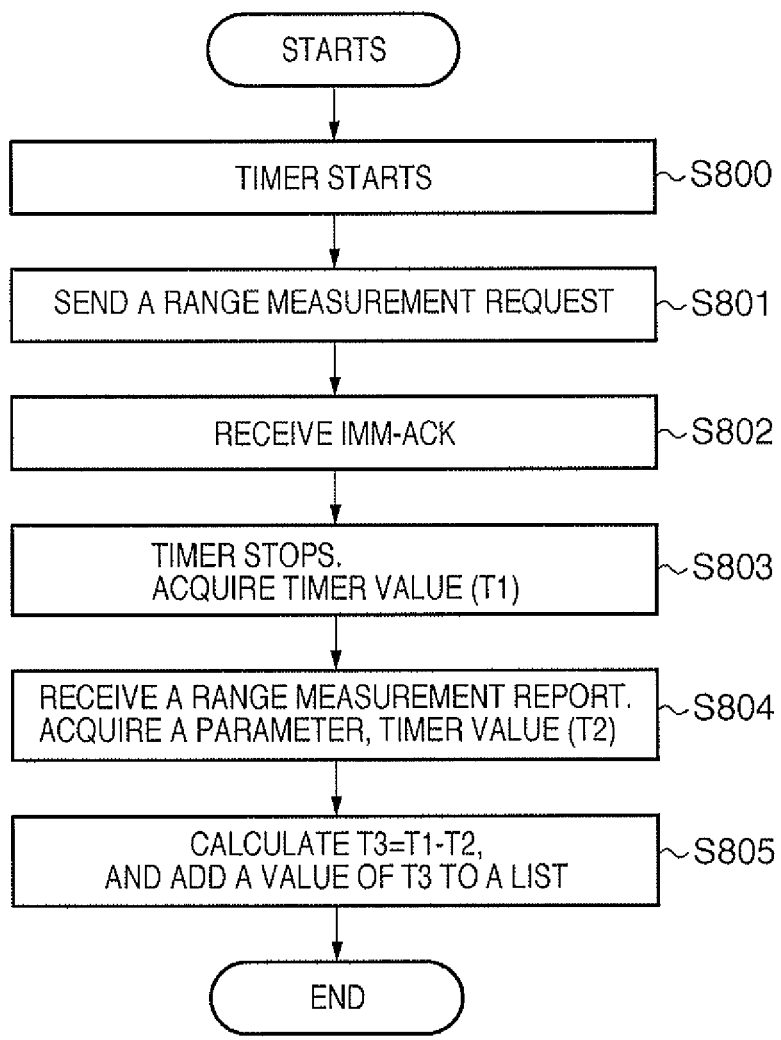

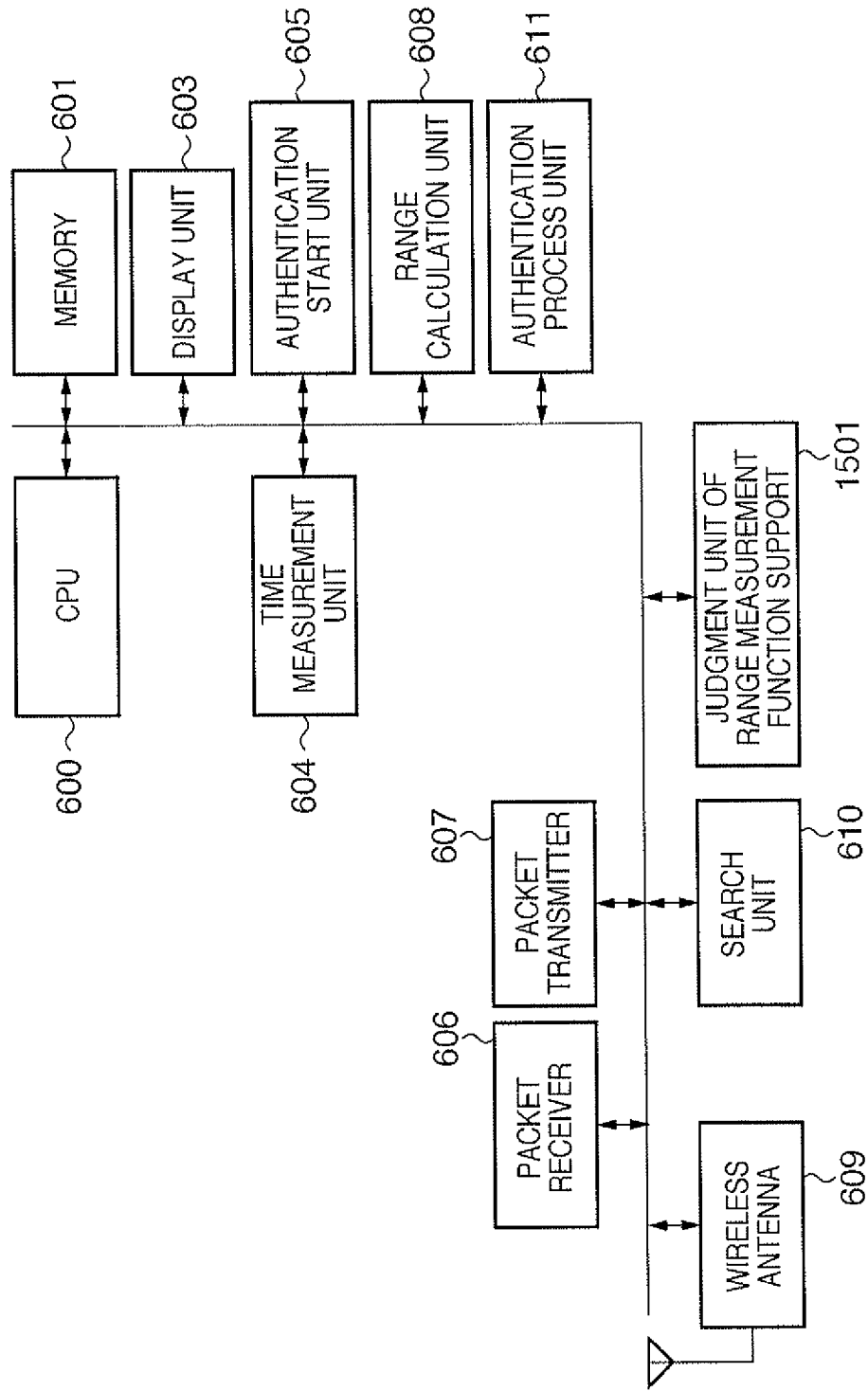

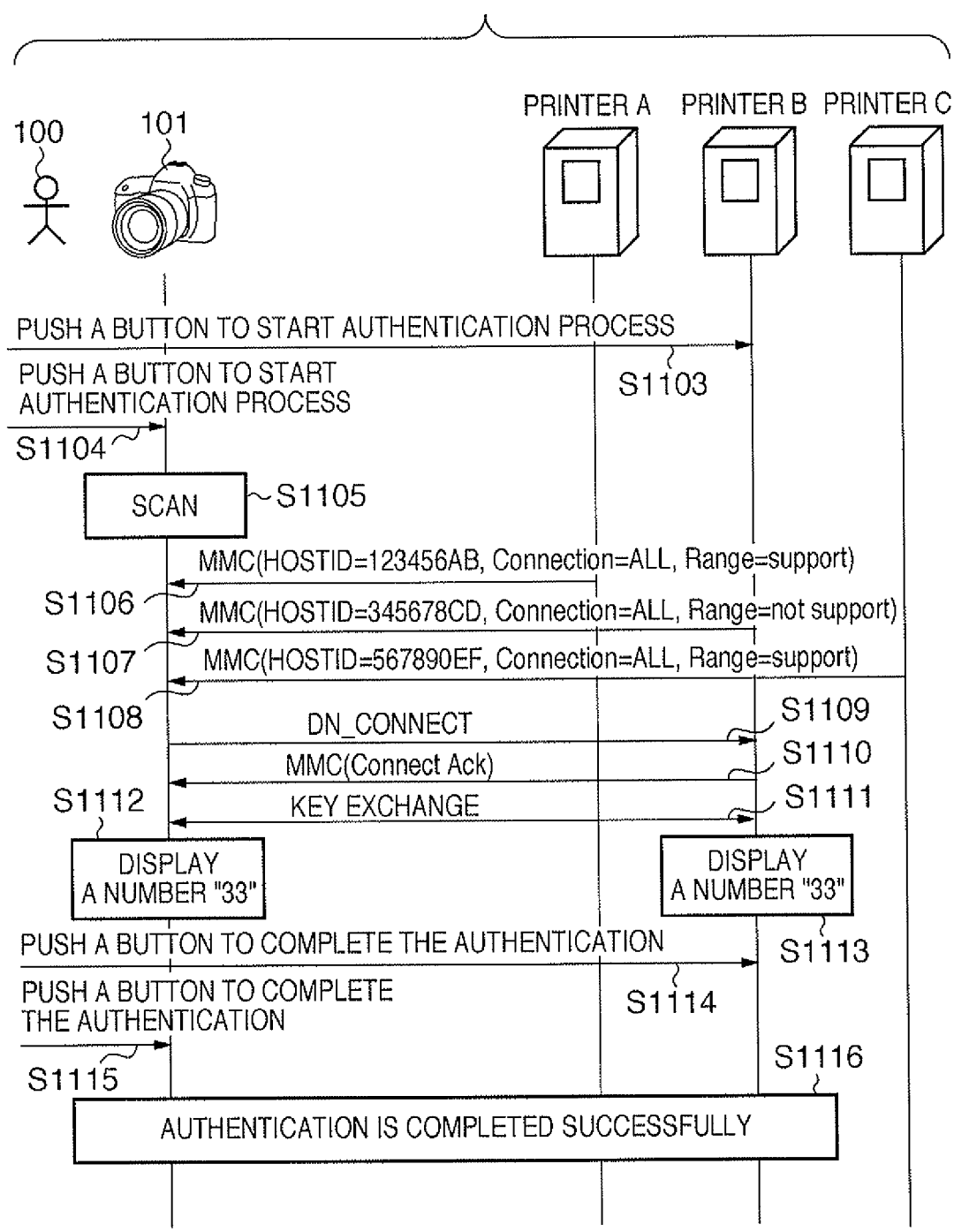

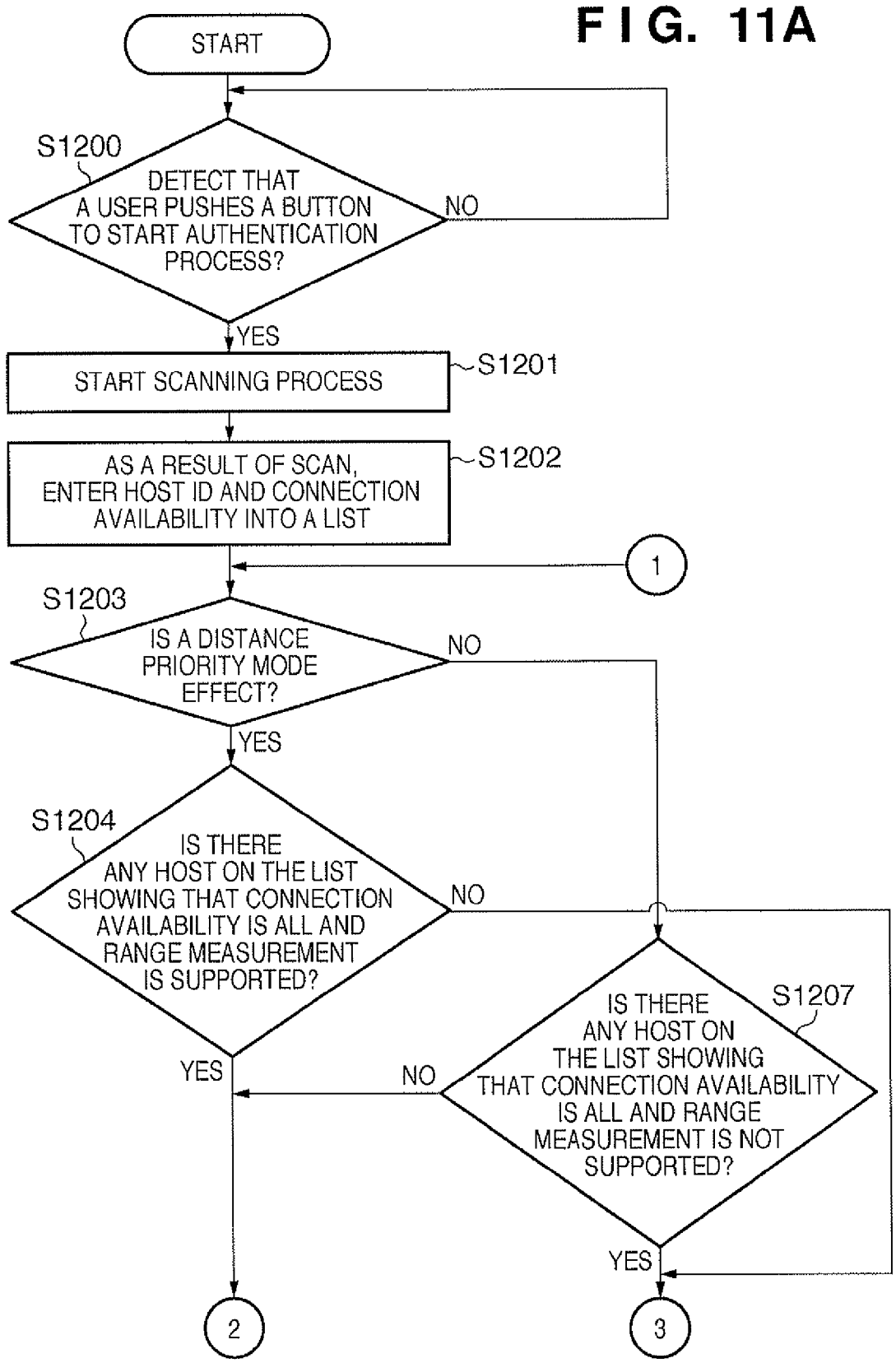

F I G. 12

| No. | HOST ID | Connection Availability | Range Measurement Capability |
|---|---|---|---|
| 1 | 012345AB | ALL | supported |
| 2 | 234567CD | ALL | not supported |
| 3 | 456789EF | ALL | supported |

COMMUNICATION UNIT, METHOD OF CONTROLLING COMMUNICATION UNIT AND COMPUTER PROGRAM

BACKGROUND OF THE INVENTION

1. Field of the Invention

The present invention relates to a communication unit, which implements an authentication process and to a method for controlling the communication unit.

2. Description of the Related Art

There is a wireless USB system to realize USB protocols with wireless communication. In the wireless USB system, an authentication process between a communication host and a communication device is required before starting communication. There are numeric and cable associations within the authentication process.

In the numeric association authentication process, a communication device is wirelessly connected to a host and keys are exchanged between them. Then, if a numeric number displayed in the host matches a numeric number displayed in the communication device as a result of the key exchange, the authentication process is complete after each button for verifying match of the keys is pushed at both the host and the communication device. If the numeric number displayed does not match, or if only one numeric number is displayed in the host or the communication device, the authentication process does not complete successfully.

Now consider a case where a user having a digital camera uses a printer to print an image stored in the digital camera. The printer has a wireless USB host communication function while the digital camera has a wireless USB device communication function. The host and devices for wireless USB communication also support the WiMedia specification. The WiMedia specification is a specification for the communication layer below the Wireless USB specification.

FIG. 1 shows operation sequences for the case of having a plurality of printers. It is assumed that a user 100 would like to perform an authentication process in order to connect the digital camera to the printer B which is nearest to the digital camera.

Step 400: It is assumed that another user 303 has already pushed the button of the printer A and the button of his digital camera for starting the authentication process.

Step 401: Then, the user 100 pushes the button of the printer B for starting the authentication process.

Step 402: The user pushes the button of the digital camera 101 for starting the authentication process.

Step 403: Because the button for stating authentication is already pushed, MMC information of the printer A will indicate an available state of receiving authentication (ConnectAvailability=ALL). In this case, it is assumed that the digital camera 101 discovers the information stored in MMC of the printer A, as a matter of course.

Step 404: Therefore, the digital camera is then connected to the printer A. Because it is not possible to obtain device information prior to authentication in the Wireless USB specification, the digital camera will be connected to the device which it discovers first.

Step 405: The digital camera 101 receives a connection acknowledgement via a Connect ACK of the MMC information transmitted from the printer A.

Step 406: The digital camera 101 and printer A exchange keys with each other.

Step 407: The numeric characters are displayed on a display of the printer A.

Step 408: The numeric characters are displayed on a display of the digital camera.

However, the user may recognize that the authentication has failed because the numeric characters of the authentication are not displayed on the display of the printer B. Thus, the printer B by which the user 100 would like to print the image, cannot be connected to the digital camera because the key was exchanged for the printer A, which was discovered first. Therefore, the user must repeat the authentication process from the beginning. However, even if the authentication process is applied again, successful authentication depends on the operational status of other printers and is not guaranteed to succeed for the printer B near the digital camera thus becoming a source of user frustration.

Japanese Patent Laid-Open No. 2004-015654 describes a communication unit that is connected to a target communication unit based on information of from other communication units regarding received power levels, which communication units collect by transmitting their received power signal level to each other. However, the RF receiving level is variable, and accurate measurement of range using the RF receiving level is not possible.

In the past, communication units sometimes have difficulty in rapidly authenticating other communication units with which a user wishes to communicate, among a plurality of other communication units.

The present invention provides a wireless communication unit for rapidly authenticating with other wireless communication units with which a user wishes to connect.

SUMMARY OF THE INVENTION

The communication unit of the present invention comprises: a measurement unit for measuring the range to other communication units and an authentication unit for authenticating a communication unit selected using the measurement result from the measurement unit.

As described above, a wireless communication unit in the present invention has an effect of quickly authenticating a communication unit near a user among a plurality of other wireless communication units.

Further features of the present invention will become apparent from the following description of exemplary embodiments with reference to the attached drawings.

BRIEF DESCRIPTION OF THE DRAWINGS

FIG. 6 shows a functional block diagram of a wireless communication unit (a printer) according to the first embodiment.

FIG. 7 shows an operational sequence between a digital camera and a plurality of printers according to the first embodiment.

FIG. 8 shows a flow chart of whole system according to the first embodiment.

FIG. 9 shows MMC information of a plurality of printers according to the first embodiment.

FIG. 10 shows MMC information and calculated time for printers according to the first embodiment.

FIGS. 11A and 11B show flow charts of processing a time measurement according to the first embodiment.

FIG. 12 shows a functional block diagram of wireless communication unit according to the second embodiment.

DESCRIPTION OF THE EMBODIMENTS

Embodiments of the present invention will be described below. The individual embodiments to be described will be useful in understanding various concepts of the present invention from the general to the specific visualization. Moreover, it should be understood that the technical scope of the present invention is defined by the appended claims and not limited by the individual embodiments below.

First Embodiment

Figure 1:
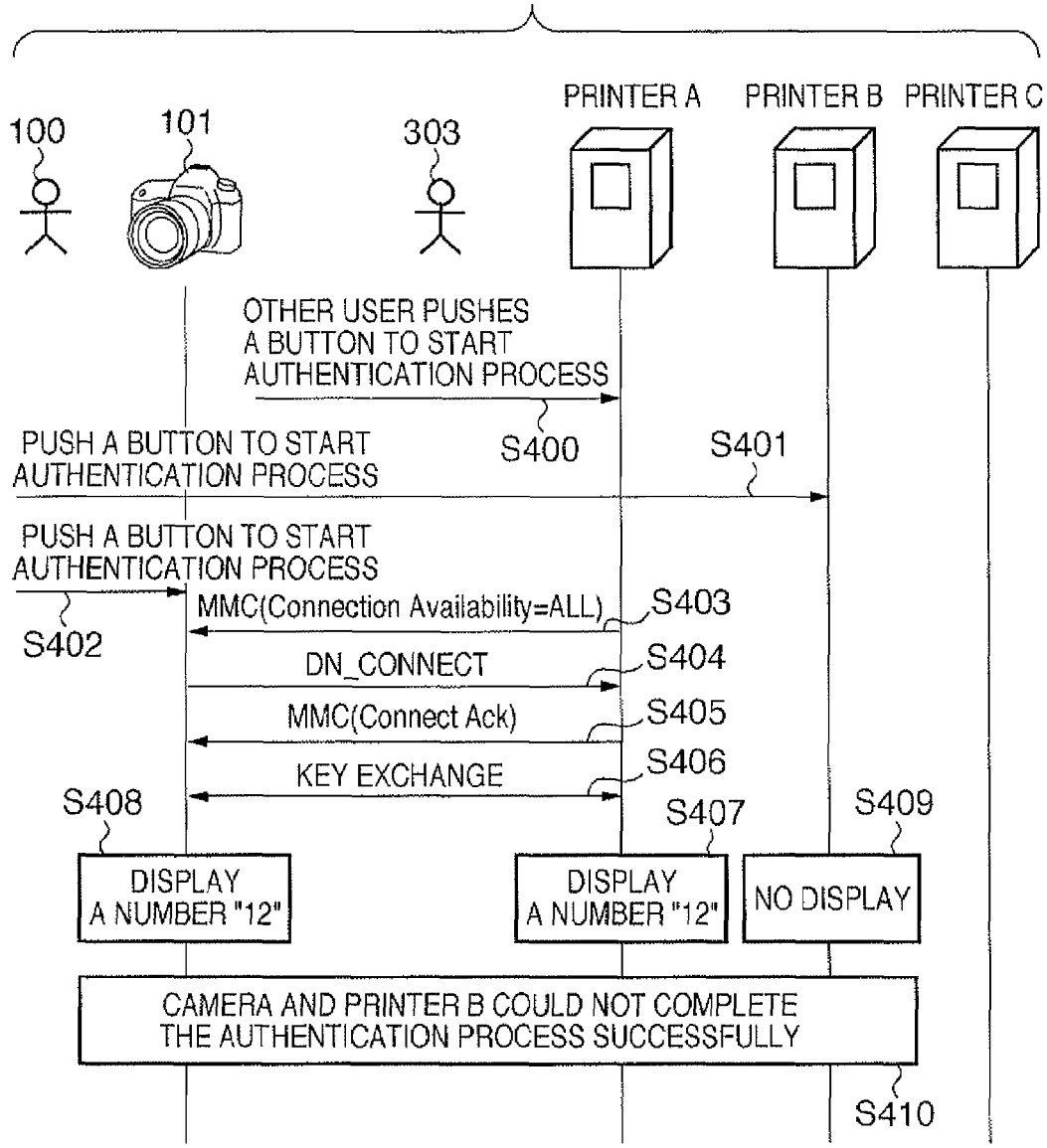
FIG. 1 shows a structure of a digital camera and a printer according to conventional technology.
Figure 2:
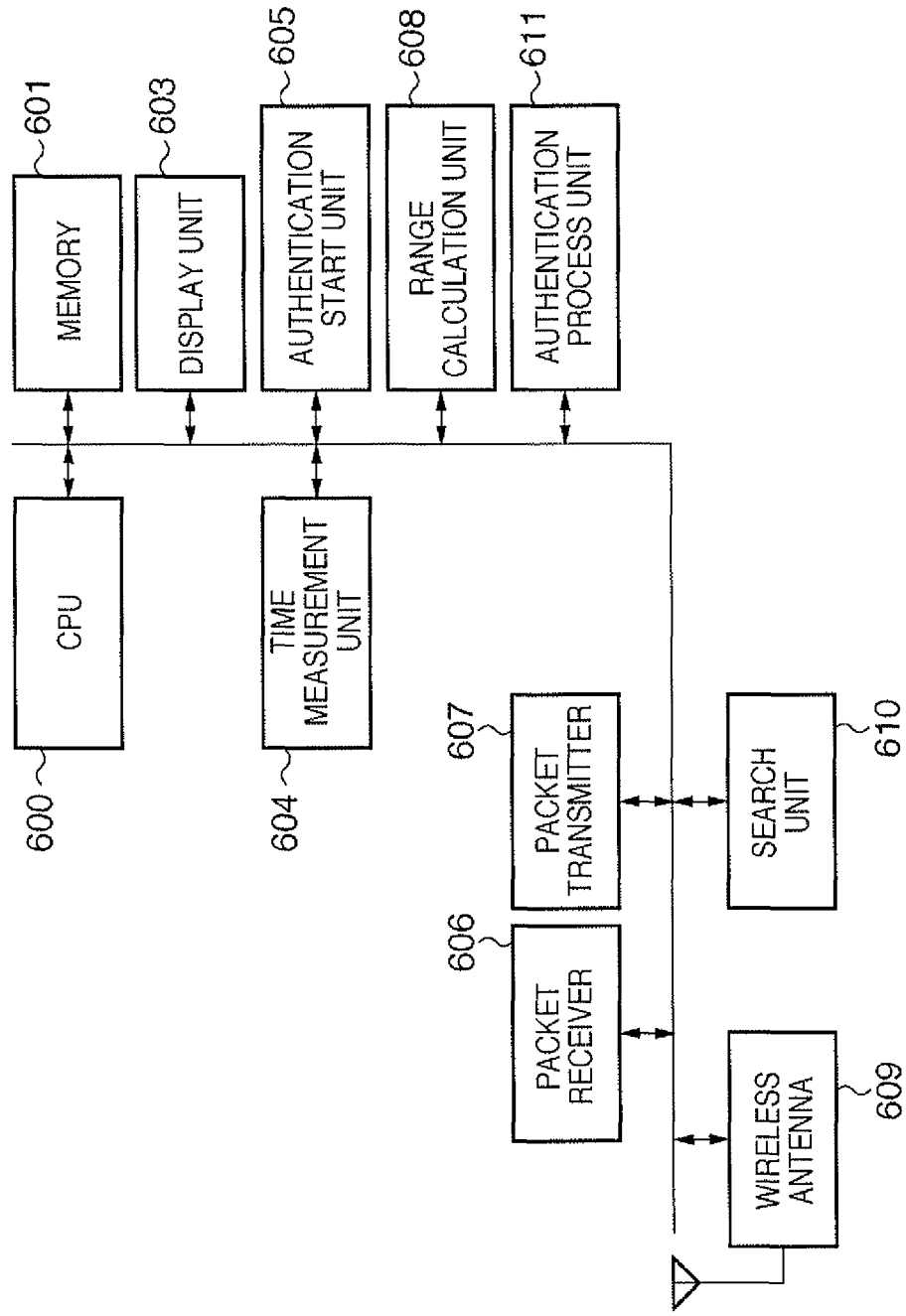
FIG. 2 shows an operational sequence between a digital camera and a printer according to conventional technology.

FIG. 2 is a functional block diagram showing a digital camera which is a first communication unit in a wireless communication system.

CPU 600 is connected to other functional sections via data bus and controls operations of whole system.

A memory 601 stores programs that implement the first embodiment and the like when executed.

An authentication start unit 605 detects an authentication start trigger, which is given by a user, and starts the authentication.

A search unit 610 analyzes MMC information and WiMedia beacon information included in a control packet which is sent from at least one communication unit, and determines what kind of communication units exist in the surrounding area. The MMC information comprises HOST ID and connection availability for indicating whether or not authentication is in the state of reception. The WiMedia beacon information comprises Range Measurement Capability for indicating whether or not range measurement and the like is supported. In this case, the authentication protocol receiving state is treated as one of the parameters of connection availability. Also, the search unit 610 extracts wireless communication devices from the MMC information, which are available for receiving authentication.

A time measurement unit 604 has a timer and measures a round trip time by sending a range measurement request packet to the located wireless communication unit and measuring an amount of time until receiving an acknowledgement packet from it.

A wireless communication unit comprises an antenna unit 609, a packet receiver 606, and a packet transmitter 607, and transmits/receives to/from other communication units located in the surrounding area.

A range calculation unit 608 determines the range between itself and another communication unit by using a round trip time and an internal processing time sent from the located communication unit.

The authentication protocol processing unit 611 is connected to the communication unit nearest to a given station based on the range between other communication units and itself, as calculated by the range calculation unit 608, and performs two-way authentication.

In this case, the nearest communication unit is connected to the given station. However, two-way authentication may be applied to one of the other communication units by arranging the other communication units in the order of shortest range and connecting to one of them in an arbitrary order.

Display unit 603 displays for the user the authentication result and etc.

Figure 3:
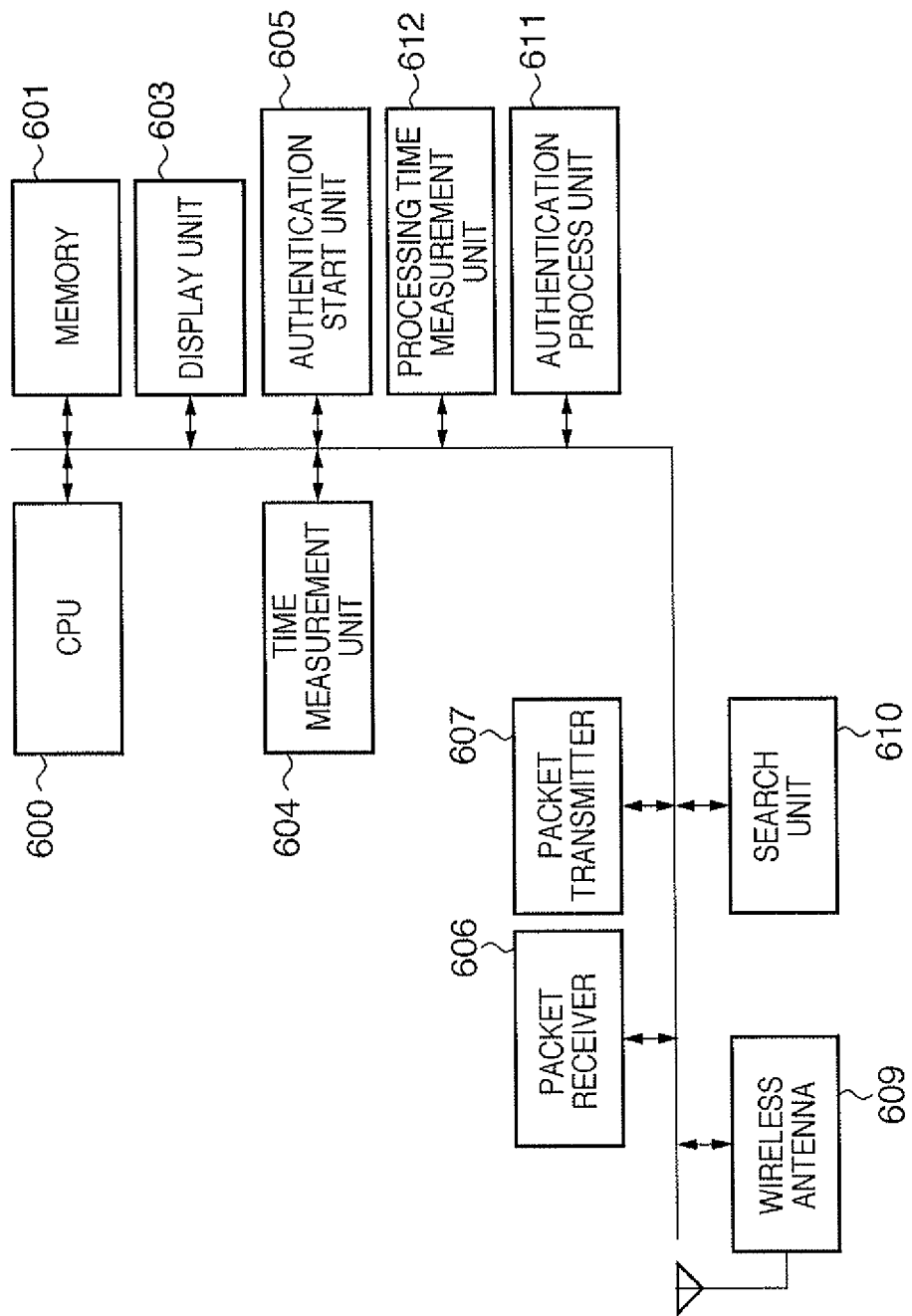
FIG. 3 shows a structure of a digital camera and plurality of printers according to conventional technology.

FIG. 3 is a block diagram showing a printer corresponding to the other communication unit in area surrounding the first communication unit according to the first embodiment.

Only blocks, which are different from the block diagram of the digital camera in FIG. 2, will be described because the basic functional diagram of FIG. 3 is almost same as that of FIG. 2.

A time measurement unit 604 measures a processing time by receiving a ranging measurement request from the digital camera and measuring a time until sending an acknowledge packet to it, and then the measurement result is sent to a processing time measurement unit 612.

The processing time measurement unit 612 sends the measurement result as an internal processing time to a packet transmitter 607.

The packet transmitter 607 generates a packet reporting the internal processing time by using the received internal processing time, and sends it to the digital camera via an antenna 609.

Figure 4:
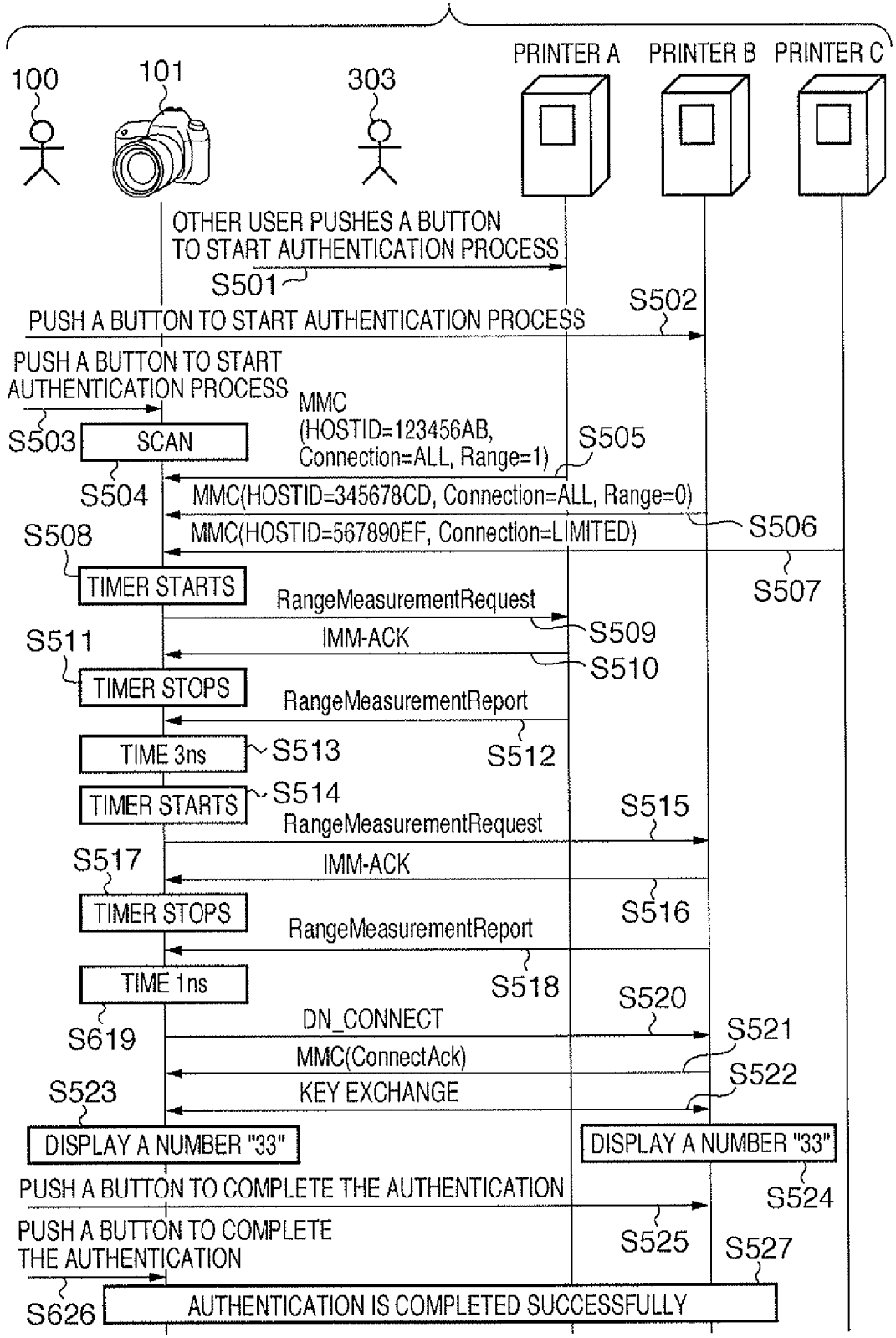
FIG. 4 shows an operational sequence between a digital camera and a plurality of printers according to conventional technology.

FIG. 4 is a diagram showing a sequence of process flow between a digital camera and a plurality of printers according to the first embodiment.

A whole operation sequence according to the first embodiment will be described using the sequence diagram in FIG. 4.

Step 501: First, another user 303 pushes a button of a printer A for starting authentication process.

Step 502: After the other user 303 pushes a button of a printer A for starting authentication process, it is assumed that a user 100 pushes a button of a printer B for starting an authentication process, to which the user 100 wishes to connect.

Step 503: Next, the user 100 pushes a button of the digital camera 101 for starting an authentication process.

Step 504: A search unit 610 starts scanning to search wireless communication units in the surrounding area. Scanning in the search unit 610 is performed by receiving MMC packets sent from the antennas of the communication units in the surrounding area.

Steps 505-507: A packet receiver 606 receives the MMC packets and WiMedia beacons from each of the printers A, B and C. In this case, the digital camera 101 determines that the printers A and B are in the state of accepting authentication and then begin to measure the ranges to the printers A and B.

Step 508: The time measurement unit 604 prepares to measure a round-trip time regarding the printer A.

Step 509: The packet transmitter 607 transmits a ranging measurement request packet to the printer A, one of the located communication units, and at the same time, the time measurement unit 604 starts time measurement by starting a timer.

Step 510: The packet receiver 606 receives an acknowledgement packet from the printer A via the antenna 609.

Step 511: At the same time, the time measurement unit 604 stops the measurement by stopping the timer, and then determines the round trip time T1 corresponding to the printer A.

Step 512: The packet receiver 606 receives a reporting message of an internal processing time (T2) from the printer A via the antenna 609.

Step 513: The range calculation unit 608 acquires the range time between itself and the printer A by subtracting the internal processing time from the round-trip time T1.

Step 514: The time measurement unit 604 prepares to measure a round trip time corresponding to the printer B.

Step 515: The packet transmitter 607 transmits a range measurement request packet to the printer B, one of the remaining located communication units via the antenna 609. At the same time, the time measurement unit 604 begins the time measurement by starting a timer.

Step 516: The packet receiver 606 receives an acknowledgement packet from the printer B via the antenna unit 609.

Step 517: At the same time, the time measurement unit 604 stops the measurement by stopping the timer, and then determines the round trip time T1 corresponding to the printer B.

Step 518: The packet receiver 606 receives a reporting message of an internal processing time (T2) from the printer B via the antenna unit 609.

Step 519: The range calculation unit 608 acquires the range time between itself and the printer B by subtracting the internal processing time from the round trip time.

Step 520: The authentication protocol processing unit 611 compares the range to the printer A with the range to the printer B, and selects the printer B because the range to the printer B is shorter. Then the authentication protocol processing unit 611 connects the digital camera 101 to the printer B via the packet transmitter 607 and the antenna unit 609.

Step 521: The packet receiver 606 receives a connection complete message (ConnectAck) from the printer B via the antenna unit 609.

Step 522: The authentication protocol processing unit 611 in the digital camera 101 and the printer B exchange keys with each other.

Step 523: The display unit in the digital camera 101 displays the number calculated by using the key from the printer B.

Step 524: The display unit of the printer B displays the number calculated by using the key from the digital camera.

Step 525: The user 100 confirms the number of the printer B and pushes the button of the printer B to complete the authentication process.

Step 526: The user 100 confirms the number of the digital camera 101 and pushes the button of the digital camera to complete the authentication process.

Step 527: The authentication process is complete.

Figure 5:
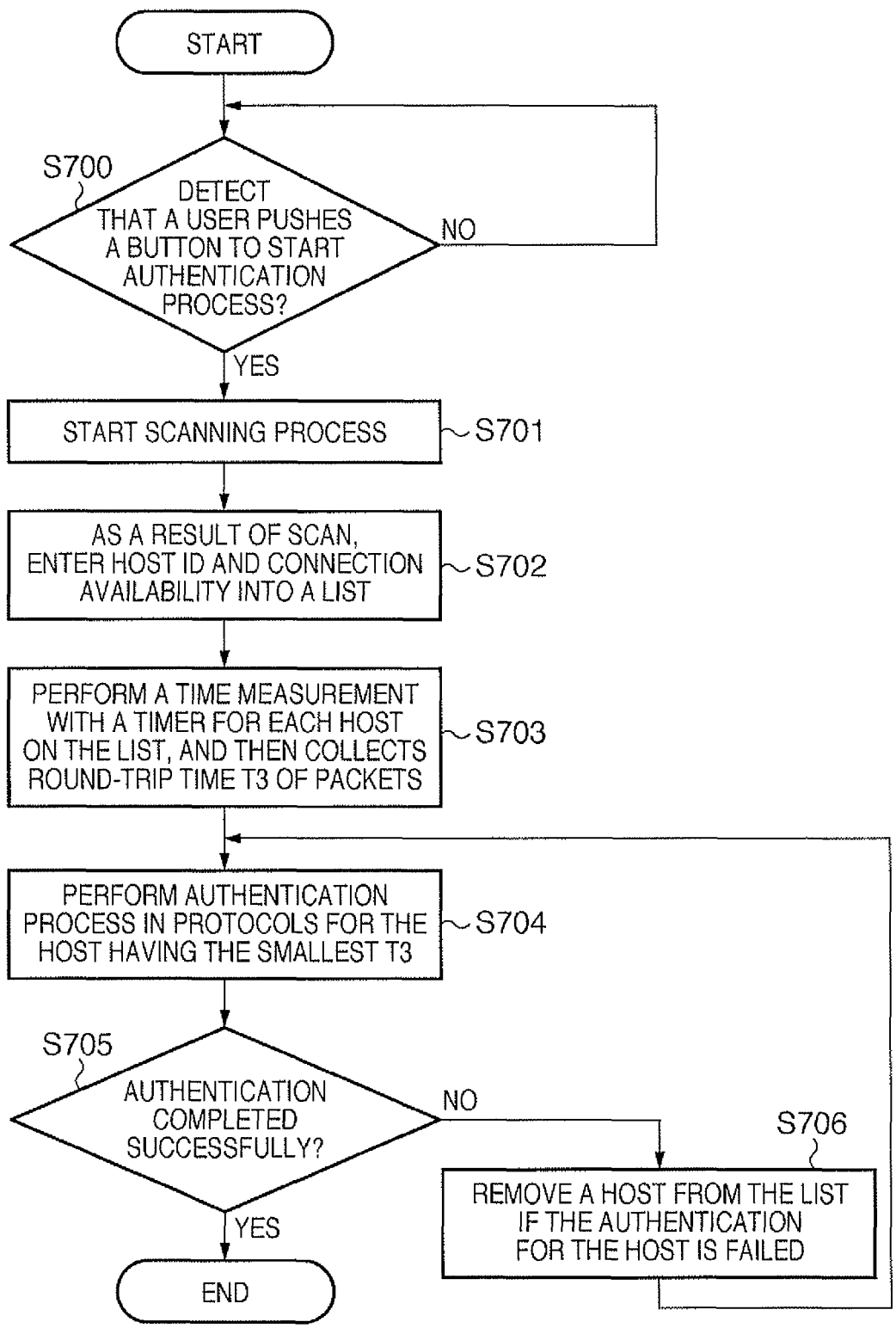
FIG. 5 shows a functional block diagram of a wireless communication unit (digital camera) according to the first embodiment.

FIG. 5 is a flowchart depicting all operation flows according to the first embodiment.

FIG. 6 shows MMC information of a plurality of printers according to the first embodiment.

FIG. 7 shows calculated range time and MMC information of a plurality of printers.

Next, the operation flows in FIG. 5 are described using FIGS. 6 and 7.

Step 700: The authentication start unit 605 detects a button push event of the user 100 on the digital camera.

Step 701: The search unit 610 starts to scan for searching wireless communication units in the surrounding area. The search unit 610 scans by receiving MMC packets and WiMedia beacons transmitted from the wireless communication units in the surrounding area, via the antenna 609.

Step 702: The search unit 610 creates a list of the content of the received MMC information as shown in FIG. 6. The communication units (hosts) can be identified using this list. This list shows HOST ID, Connection Availability for indicating the state of reception for authentication and the time T3 indicating a round-trip time of packets.

Step 703: The time measurement unit 604 and the range calculation unit 608 perform a time measurement process using a timer for all hosts which show that the connection is available (Connection Availability=ALL) on the list in FIG. 6. First, it performs the time measurement to the printer A, which has HOST ID, "012345AB" as shown in No. 1 of FIG. 6. Similarly, it performs timer measurement to the printer B, which has HOST ID, "234567CD" as shown in No. 2 of FIG. 9. As a result, it acquires the time T3 to determine the range between itself and each printer as shown in FIG. 7.

Step 704: The authentication protocol processing unit 611 starts the authentication process using protocols for the printer B which has the smallest value of T3 on the list in FIG. 7.

Step 705: The authentication protocol processing unit 611 stops the authentication process when the authentication is completed successfully.

Step 706: If the authentication fails, the authentication protocol processing unit 611 removes the printer B from the list of objects to be connected. The authentication process is applied to the printer having the smallest T3 among printers in the list from which the printers for which authentication failed are removed.

FIG. 8 is a flow chart for performing time measurement according to the first embodiment. The process of timer measurement is described with this flow chart.

Step 800: The CPU 600 orders the packet transmitter 607 to prepare to send a ranging measurement request packet.

Step 801: The packet transmitter 607 sends a range measurement request packet to the communication units in the surrounding area via the antenna unit 609. At the same time, the time measurement unit 604 begins the time measurement by starting a timer.

Step 802: The packet receiver receives an acknowledgement packet from the communication unit via the antenna unit 609 in the surrounding area.

Step 803: The timer measurement unit 604 stops the timer when the acknowledgement packet is received.

Step 804: The range calculation unit 608 acquires an internal processing time packet indicating the internal processing time amount (T2) through the packet receiver 606 via the antenna unit 609.

Step 805: The range calculation unit 608 calculates T3 via the following equation using the round-trip time (T1) and the internal processing time (T2): T3=T1−T2. Then, the range calculation unit 608 adds the calculated T3 as T3 in FIG. 7.

For example, the process of the range measurement may be performed in accordance with a similar process based on the WiMedia specification. If the range measurement function is not supported by the station or by the wireless communication unit to be connected, a round trip time obtained by sending a packet from the packet transmitter 607 to the communication unit and measuring the time until receipt of an acknowledgement packet from it can be used in lieu of T3.

Second Embodiment

In the second embodiment, the authentication process for a digital camera is applied on a priority basis to printers which do not have a range measurement function.

FIG. 9 is a function block diagram of a wireless communication unit (digital camera) according to the second embodiment.

The function blocks indicated with the same numbers in FIG. 5 according to the first embodiment are already described. Therefore, in this embodiment, only a judgment unit of range measurement function support 1501, which is added as new function, will be described.

The judgment unit of range measurement function support 1501 investigates the state of supporting range measurement function showed in WiMedia beacon information, which is acquired by the search unit of wireless communication units.

It then determines whether or not any printer exists without the range measurement function.

FIG. 10 shows operational sequences between a digital camera and a plurality of printers in the second embodiment. In this case, it is a printer B that does not have the range measurement function.

Step 1103: A user 100 pushes a button for starting an authentication process with the printer B to which the user wishes to connect the digital camera. Also, it is assumed that other users already pushed the buttons of the printers A and C to start their authentication process.

Step 1104: The user 100 pushes a button of the digital camera 101 to start the authentication process.

Step 1105: A search unit 610 starts scanning to search wireless communication units in the surrounding area. The search unit 610 scans by receiving MMC packets and WiMedia beacons, transmitted from the wireless communication units in the surrounding area, via the antenna 609.

Step 1106 to 1108: A packet receiver 606 receives the MMC packets and WiMedia beacons from the printer A, the printer B and the printer C.

Step 1109: The search unit 610 investigates information in the MMC packets received from each printer. It acquires values of HOST ID for identifying hosts and Connection Availability for indicating the authentication process state. At the same time, it acquires Range Measurement Capability values indicating the state of range measurement function support included in the signals of the WiMedia beacons. The acquired values are sent to the range measurement function support judgment unit 1501. Then the judgment unit 1501 determines whether or not any printer exists without the range measurement function. Next, via a packet transmitter 607 and an antenna unit 609, the authentication protocol processing unit 611 connects the digital camera 101 to the unit (printer B), which is recognized by the judgment unit 1501 as a communication unit without the range measurement function among units (printers) in the authentication process state.

Step 1110: A packet receiver 606 receives a message of connection completion (ConnectAck) from the printer B via the antenna unit 609.

Step 1111: The authentication protocol processing units 611 of the digital camera and the printer B perform key exchanges of their respective keys.

Step 1112: The display unit of the digital camera 101 displays the number calculated using the exchanged key.

Step 1113: The display unit of the printer B displays the number calculated using the exchanged key Step 1114: The user 100 confirms the number of the exchanged key and pushes the button of the printer B to complete the authentication process.

Step 1115: The user 100 confirms the number of the exchanged key and pushes a button of the digital camera 101 to complete the authentication process.

Step 1116: The authentication process is complete.

Figure 11B:
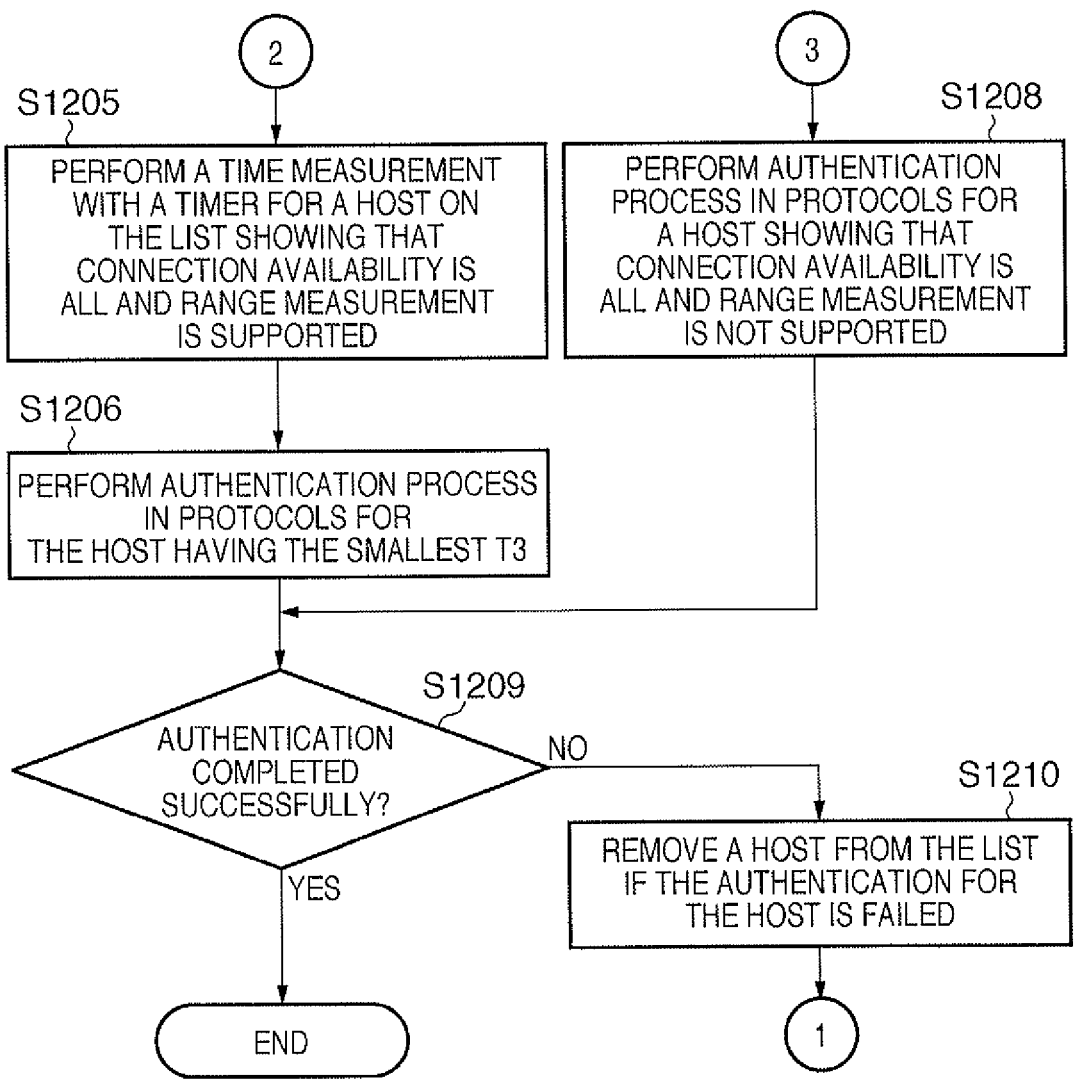

FIGS. 11A and 11B are flow charts depicting operations in the digital camera according to the second embodiment. The operations of the digital camera 101 will be described with reference to the flow chart.

Step 1200: An authentication start unit 605 detects that a user 100 pushed a button of the digital camera.

Step 1201: The search unit 610 begins to scan for searching wireless communication units in the surrounding area. The search unit 610 scans by receiving MMC packets and WiMedia beacons, transmitted from wireless communication units in the surrounding area, via the antenna 609.

Step 1202: The search unit 610 acquires HOST ID for identifying hosts and Connection Availability for indicating the authentication process state. It further acquires Range Measurement Capability for indicating the state of supporting range measurement function included in WiMedia beacons. FIG. 12 shows a list of MMC information of a plurality of printers in the second embodiment. This list indicates HOST ID for identifying hosts, Connection Availability for indicating the authentication process state, and support status for Range Measurement Capability in the WiMedia beacons, which are acquired by the search unit 610. The judgment unit of range measurement support 1501 determines the support status of Range Measurement Capability. According to the second embodiment, the printer B having HOST ID, "234567CD" will be determined to be a printer without Range Measurement Capability (i.e., range measurement function is not supported).

Step 1203: The judgment unit 1501 determines whether or not any printer exists without range measurement function. If a printer without range measurement function exists, control proceeds to step 1207 because a priority mode of Non-Range Measurement Capability is effective. If a printer without range measurement function does not exist, control proceeds to step 1204 because a priority mode of range is effective.

Step 1204: The search unit 610 investigates whether there is a printer among the located printers, which has "ALL" in Connection Availability and has the support of range measurement function. If there exists such a printer, control proceeds to Step 1205.

If there is no such printer, control proceeds to Step 1208.

Step 1205: The search unit 610 extracts printers which have "ALL" in Connection Availability and have the range measurement function support. The time measurement unit 604 and the range calculation unit 608 perform the range measurement as shown in the Step 703 of FIG. 5, and calculate the time T3 to determine the range.

Step 1206: As described in Step 704 of FIG. 5, the authentication protocol processing unit 611 begins to apply protocols of the authentication process to the printer having the smallest value of T3.

Step 1207: The search unit 610 investigates whether there is a printer among the located printers which have "ALL" in Connection Availability and do not have the range measurement function. If there exists such a printer, control proceeds to Step 1208. If there is no such printer, the control proceeds to Step 1205.

Step 1208: The authentication protocol processing unit 611 applies the protocols of the authentication process to the printer which has "ALL" in Connection Availability and does not have range measurement function support, and control proceeds to Step 1209.

Step 1209: The authentication protocol processing unit 611 ends the authentication process if authentication is completed successfully.

Step 1210: If authentication fails, the authentication protocol processing unit 611 removes the printer from the list of objects to be connected.

Connection of a digital camera to a printer without range measurement support is not considered in the first embodiment, as set forth above. However, according to the second embodiment, printers without a range measurement function are capable of connecting to the digital camera. This arrangement of the second embodiment gives the effect that the digital camera can be connected to a printer even if the printer does not have a range measurement function.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-290330, filed Nov. 12, 2008, which is hereby incorporated by reference herein in its entirety.

What is claimed is:

1. A communication apparatus comprising:
a search unit configured to search a plurality of other communication apparatuses, which are communicable directly with the communication apparatus and on each of which a predetermined operation associated with authentication has been performed by a user;
a measurement unit configured to measure a distance between the communication apparatus and each of the searched plurality of other communication apparatuses; and
an authentication unit configured to perform authentication processing with one of the searched plurality of other communication apparatuses, which is selected from among the searched plurality of other communication apparatuses based on a result of measurement of the distances by the measurement unit.

2. The communication apparatus according to claim 1, wherein the search unit searches the plurality of other communication apparatuses after receiving a trigger by a user for starting authentication.

3. The communication apparatus according to claim 1, wherein the measurement unit measures the distances based on round-trip times of a predetermined packet for each of the searched plurality of other communication apparatuses.

4. The communication apparatus according to claim 3, wherein the round-trip times are measured as the amount of each of times from when transmitting a packet to each of the searched plurality of other communication apparatuses and to when receiving a response packet from each of the searched plurality of other communication apparatuses.

5. The communication apparatus according to claim 1, wherein the authentication unit performs the authentication processing with the one of the searched plurality of other communication apparatuses in order of shortest distance.

6. The communication apparatus according to claim 1, wherein the measurement unit measures distances to each of at least one of the searched plurality of other communication apparatuses, which is selected based on a condition of support of a distance measurement function of the searched plurality of other communication apparatuses.

7. A method of controlling a communication apparatus, comprising:
searching a plurality of other communication apparatuses, which are communicable directly with the communication apparatus and on each of which a predetermined operation associated with authentication has been performed by a user;
measuring distances between the communication apparatus and each of the searched plurality of other communication apparatuses; and
performing authentication processing with one of the searched plurality of other communication apparatuses, which is selected from among the searched plurality of other communication apparatuses based on a result of measurement of the distances.

8. A non-transitory computer-readable storage medium storing a computer program that when executed enables a computer to perform the method according to claim 7.

9. The communication apparatus according to claim 1, wherein the search unit searches a plurality of other communication apparatuses communicable directly with the communication apparatus and being in state of accepting authentication.

* * * * *